United States Patent
Aynsley et al.

(10) Patent No.: US 12,297,839 B2
(45) Date of Patent: May 13, 2025

(54) CEILING FAN WITH CONCENTRIC STATIONARY TUBE AND POWER-DOWN FEATURES

(71) Applicant: DELTA T, LLC, Lexington, KY (US)

(72) Inventors: Richard M. Aynsley, Doonan (AU); Richard W. Fizer, Lexington, KY (US); Richard A. Oleson, Lexington, KY (US); J. Carey Smith, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 719 days.

(21) Appl. No.: 17/187,032

(22) Filed: Feb. 26, 2021

(65) Prior Publication Data

US 2021/0180602 A1 Jun. 17, 2021

Related U.S. Application Data

(60) Continuation of application No. 15/284,127, filed on Oct. 3, 2016, which is a division of application No. (Continued)

(51) Int. Cl.
*F04D 25/08* (2006.01)
*F04D 25/06* (2006.01)
(Continued)

(52) U.S. Cl.
CPC ......... *F04D 25/088* (2013.01); *F04D 25/068* (2013.01); *F04D 27/004* (2013.01); (Continued)

(58) Field of Classification Search
None
See application file for complete search history.

(56) References Cited

U.S. PATENT DOCUMENTS

| | | | | |
|---|---|---|---|---|
| 6,102,663 A | * | 8/2000 | Wang | F04D 25/088 403/114 |
| 8,147,182 B2 | * | 4/2012 | Aynsley | F04D 25/088 415/119 |
| 2003/0228142 A1 | * | 12/2003 | Reiker | F04D 29/582 392/364 |

FOREIGN PATENT DOCUMENTS

| | | | | |
|---|---|---|---|---|
| EP | 0979949 A1 | * | 2/2000 | F04D 29/34 |
| JP | 59141797 A | * | 8/1984 | F04D 25/088 |

OTHER PUBLICATIONS https://www.merriam-webster.com/thesaurus/controller (last accessed Jul. 27, 2023).*

(Continued)

*Primary Examiner* — Juan G Flores
(74) *Attorney, Agent, or Firm* — Dickinson Wright PLLC; Andrew D. Dorisio

(57) ABSTRACT

A fan system comprises a hub, a plurality of fan blades, a drive system, and a stationary tube. The hub is configured to rotate. The fan blades are mounted to the hub. The drive system comprises a rotatable hollow output shaft. The hollow output shaft is in communication with the hub, such that the drive system is operable to rotate the hub via the hollow output shaft. The stationary tube is inserted through the hollow output shaft. The stationary tube is configured to remain stationary as the hollow output shaft rotates. Wires and the like may be passed through the stationary tube, to reach an accessory mounted at the bottom of the stationary tube. The fan system may also include a detector, such as a heat detector, a smoke detector, or an accelerometer. The detector may power down the fan system in response to detecting certain conditions.

13 Claims, 8 Drawing Sheets

Related U.S. Application Data

13/942,164, filed on Jul. 15, 2013, now Pat. No. 9,458,859, and a continuation of application No. 12/399,428, filed on Mar. 6, 2009, now Pat. No. 8,672,649, said application No. 13/942,164 is a continuation-in-part of application No. 12/249,086, filed on Oct. 10, 2008, now Pat. No. 8,147,182.

(60) Provisional application No. 61/034,254, filed on Mar. 6, 2008, provisional application No. 60/978,860, filed on Oct. 10, 2007.

(51) Int. Cl.
| | | |
|---|---|---|
| *F04D 27/00* | (2006.01) | |
| *F04D 29/32* | (2006.01) | |
| *F04D 29/34* | (2006.01) | |
| *F04D 29/38* | (2006.01) | |
| *F04D 29/58* | (2006.01) | |
| *F04D 29/60* | (2006.01) | |
| *F04D 29/64* | (2006.01) | |
| *F24F 11/77* | (2018.01) | |
| *F24F 11/52* | (2018.01) | |

(52) U.S. Cl.
CPC ......... *F04D 27/008* (2013.01); *F04D 29/329* (2013.01); *F04D 29/34* (2013.01); *F04D 29/384* (2013.01); *F04D 29/5806* (2013.01); *F04D 29/601* (2013.01); *F04D 29/646* (2013.01); *F24F 11/77* (2018.01); *F24F 11/52* (2018.01)

(56) References Cited

OTHER PUBLICATIONS https://www.merriam-webster.com/dictionary/fastener (last accessed Jul. 28, 2023).*
https://www.merriam-webster.com/dictionary/flange (last accessed Jul. 28, 2023).*
https://www.merriam-webster.com/dictionary/plate (last accessed Jul. 28, 2023).*

* cited by examiner

CEILING FAN WITH CONCENTRIC STATIONARY TUBE AND POWER-DOWN FEATURES

This application is a continuation of U.S. patent application Ser. No. 15/284,127, which is a divisional of U.S. patent application Ser. No. 13/942,164, which is a continuation-in-part of U.S. Non-Provisional patent application Ser. No. 12/249,086, entitled "Ceiling Fan with Concentric Stationary Tube and Power-Down Features," filed Oct. 10, 2008, and which claims priority to U.S. Provisional Patent Application Ser. No. 60/978,860, entitled "Ceiling Fan with Concentric Stationary Tube and/or Safety Features," filed Oct. 10, 2007, and also a continuation of Ser. No. 12/399,428, which claims priority to the disclosure of U.S. Provisional Patent Application Ser. No. 61/034,254, entitled "Ceiling Fan System with Brushless Motor," filed Mar. 6, 2008. The disclosures of all of the foregoing applications are incorporated by reference herein in their entireties.

BACKGROUND

Fans and fan systems have had a variety of components and have come in a variety of configurations over the years. In the construction of vertical-shaft ceiling fans, it may be common to provide a central passage through the motor, through which wiring may be passed to provide power connections to a lamp or other accessory that may be attached below the center of the fan. For this purpose, in some situations, it may be important that the central passage, as well as the point of attachment for the lamp or accessory itself, remain stationary as the blades of the fan rotate about it. One method of construction to provide this feature may be to construct the motor with the stationary component (e.g., the stator, etc.), including the power connections and windings, in the center; and with the rotating component (e.g., the rotor, etc.), which does not contain windings or power connections, configured as a shell surrounding the stationary center component. In this construction, the provision of a stationary passage through the center may be a simple matter of forming a vertical hole through the center of the stationary motor component.

While this method of construction may be successful in relatively small fans with low-power motors, it may become impractical when the fan (and its corresponding power requirement) becomes larger, because the isolation of the heat-producing motor windings in the center of the assembly may prevent adequate heat dissipation to control the temperature of the motor windings. In some settings with these higher power applications, a conventional motor (e.g., with stationary windings on the outside and a rotating core in the center) may be more desirable, either alone or in conjunction with a speed-reducing gear box interposed between the motor and the fan hub.

In some situations, it may or may not be desirable to have a fan react in some way when there is a fire in the structure in which the fan is located. For instance, some High Volume/Low Speed fans may be large in size (e.g., between 8 and 24 feet in diameter, etc.), may move a substantial volume of air (e.g., 300,000 cubic feet or more per minute, etc.), and may be mounted as ceiling fans, hanging below the roof structure of a building. As such, in certain circumstances, it may be desirable for such a fan to be stopped from operating in the event of a fire in a building. In addition, the underside of the fan being suspended some distance below the roof may be a desirable location in which to place a fire and/or smoke detection sensor, as this location being closer to the source of a fire and/or smoke may provide an earlier detection than would result from the sensor being located at the ceiling level.

Furthermore, in some situations, it may or may not be desirable to have a fan react in some way when a component of the fan impacts an object and/or when there is an imbalance in the fan system. For instance, as noted above, some High Volume/Low Speed fans may be large in size (e.g., between 8 and 24 feet in diameter, etc.), and may be mounted as ceiling fans, hanging below the roof structure of a building. In this location, in some situations, it may be possible on occasion for a fan blade to strike an obstruction such as the raised fork structure of a fork lift. It may also be possible for a fan assembly to become out of balance due to some other cause such as an object falling onto a blade or a foreign material accumulating on a blade. In any of these situations or other situations, it may be desirable for the fan to be automatically be brought to a stop or slow down so that it will not continue to operate in an unstable or out of balance condition that might otherwise result in damage to the fan or to the surroundings.

While fans and fan systems have had a variety of components and configurations, and while fans and fan systems have been operated in a variety of ways, it is believed that no one prior to the inventors has made or used the invention recited in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Reference will now be made in detail to various embodiments of the invention, examples of which are illustrated in the accompanying drawings. To the extent that specific dimensions are shown in the accompanying drawings, such dimensions should be regarded as merely illustrative and not limiting in any way. Accordingly, it will be appreciated that such dimensions may be varied in any suitable way.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Versions of the systems and devices described herein relate to ceiling fan systems that may fall within any or all of three separate contexts. In particular, the versions of the systems and devices described herein may relate to the contexts of (a) a ceiling fan with a concentric stationary tube in a hollow output shaft; (b) a ceiling fan with fire and/or smoke detection and an automatic shut-down device; and/or (c) a ceiling fan with impact/imbalance detection and an automatic shut-down device, among other contexts. It will be appreciated that a given fan system may cross over into all three of these contexts, or may relate to only one or two of these three contexts. For instance, a given fan system may have a concentric stationary tube in a hollow output shaft, but no fi/smoke detection and no impact/imbalance detection. Alternatively, a given fan system may have a concentric stationary tube in a hollow output shaft as well as fire detection and an automatic shut-down device. Since each of (a), (b), and (c) may exist in a given fan system to the exclusion of the others of (a), (b), and (c), the three will be discussed under separate headings within this application. However, this is not intended to mean that (a), (b), and (c) must be exclusive of each other in every fan system. Suitable ways of providing (a), (b), and/or (c) in a fan system, either in isolation or in combination with others of (a), (b), and/or (c), will be apparent to those of ordinary skill in the art in view of the teachings herein.

Fan System Overview

Figure 1:
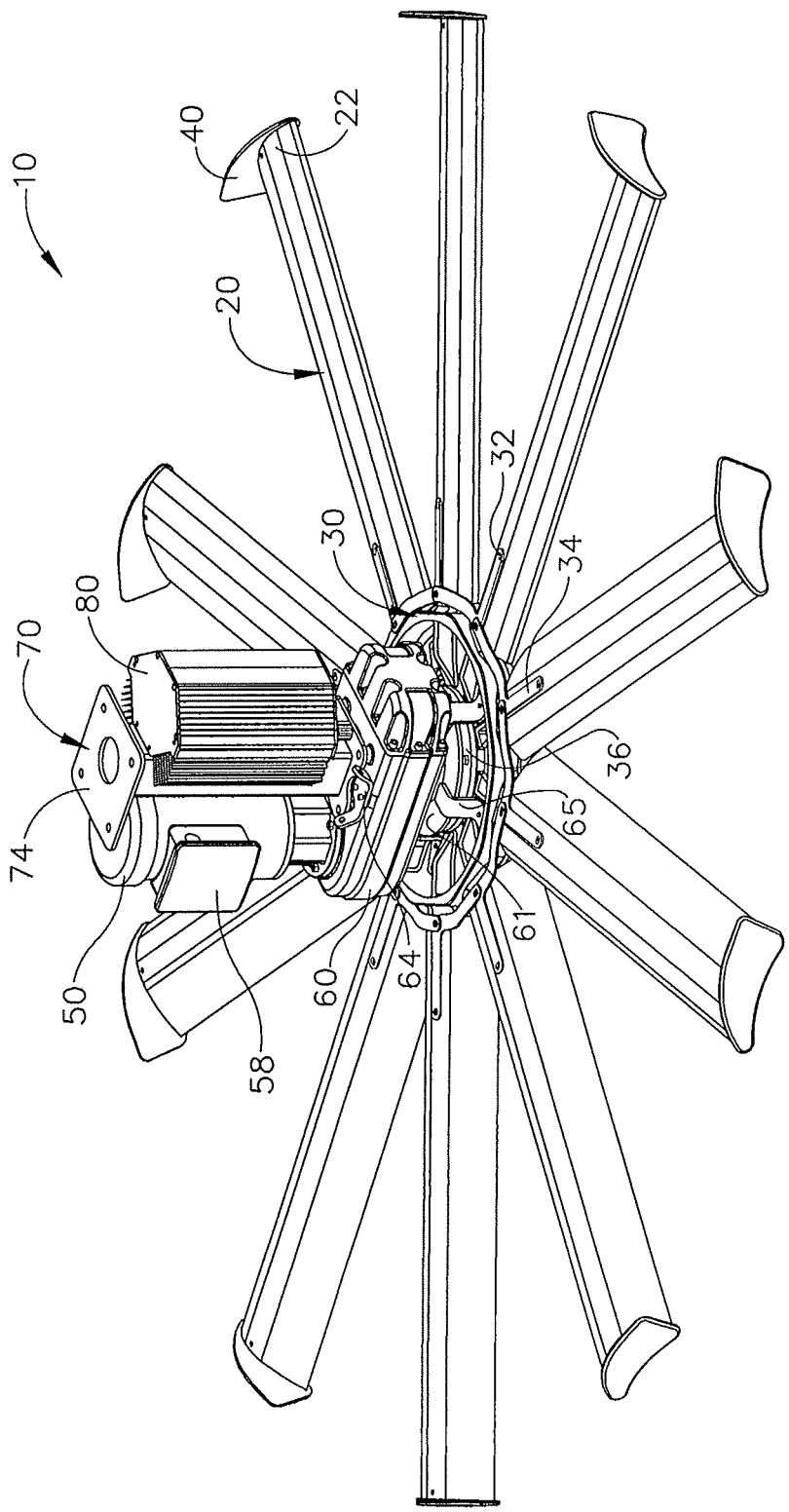
FIG. 1 depicts a perspective view an exemplary fan system.

FIG. 1 shows a merely exemplary fan system (10). Fan system (10) of this example comprises fan blades (20) and a rotating hub (30). Winglets (40) are secured to the outer end (22) of each fan blade (20) in this example, though as with other components described herein, winglets (40) are merely optional. Fan system (10) also includes a motor (50) and a gearbox (60) that rotationally drive hub (30); a mounting member (70) by which fan system (10) may be mounted to a ceiling or other structure; and a control box (80).

Fan blades (20) of the present example are substantially hollow and are formed of extruded aluminum, though any other suitable configurations, manufacturing techniques, and/or material(s) may be used. By way of example only, fan blades (20) may be configured in accordance with any of the teachings in U.S. Pat. No. 7,284,960, entitled "Fan Blades," issued Oct. 23, 2007, the disclosure of which is incorporated by reference herein. Alternatively, fan blades (20) may be configured in accordance with any of the teachings in U.S. Pub. No. 2008/0008596, entitled "Fan Blades," published Jan. 10, 2008, the disclosure of which is incorporated by reference herein. In other versions, fan blades (20) are configured in accordance with any of the teachings in U.S. Pat. No. 6,244,821, entitled "Low Speed Cooling Fan," issued Jun. 12, 2001, the disclosure of which is incorporated by reference herein. In still other versions, fan blades (20) are configured in accordance with any of the teachings in U.S. Pat. No. 6,939,108, entitled "Cooling Fan with Reinforced Blade," issued Sep. 6, 2005, the disclosure of which is incorporated by reference herein.

Fan blades (20) may define a diameter of fan system (10) of approximately 6 feet, approximately 8 feet, approximately 12 feet, or approximately 24 feet. Alternatively, fan system (10) may have any other suitable diameter defined by fan blades (20). Furthermore, other suitable configurations for fan blades (20) will be apparent to those of ordinary skill in the art in view of the teachings herein.

Hub (30) of the present example comprises a plurality of mounting members (not shown), which radiate outwardly from hub (30). Each mounting member is inserted into a respective fan blade (20), and the two are secured together with a pair of fasteners (32). Suitable configurations for a hub and methods for attaching a fan blade to a hub are disclosed in U.S. Pat. No. 7,284,960, entitled "Fan Blades," issued Oct. 23, 2007, the disclosure of which is incorporated by reference herein. Of course, any other suitable components, features, devices, or techniques may be used to secure fan blades (20) to hub (30).

Hub (30) is secured to a hub mounting flange (36) by a plurality of fasteners (not shown), though any other suitable components, features, devices, or techniques may be used to secure hub (30) to hub mounting flange (36). Hub (30) thus rotates unitarily with hub mounting flange (36). Hub mounting flange (36) is secured to output shaft (100) by a plurality of fasteners (38), as will be described in greater detail below. Hub mounting flange (36) (and, therefore, hub (30)) thus rotates unitarily with output shaft (100). Again, though, any other suitable components, features, devices, or techniques may be used to secure hub mounting flange (36) to output shaft (100). Furthermore, in some versions, hub mounting flange (36) is omitted, such that hub (30) is secured directly to output shaft (100). Other suitable components and configurations for providing rotation of hub (30) by an output shaft (100) will be apparent to those of ordinary skill in the art in view of the teachings herein.

Several metal straps (34) are also secured to fan blades (20) in the present example. By way of example only, such straps (34) may reduce the likelihood of a fan blade (20) flying off of hub (30) and injuring persons or property in the event that a hub mounting member breaks free from hub (30) or otherwise fails. However, as with other components described herein, straps (34) are merely optional, and may be varied, substituted, supplemented, or omitted as desired.

Winglets (40) may be configured in accordance with any of the teachings in U.S. Pat. No. 7,252,478, entitled "Fan Blade Modifications," issued Aug. 7, 2007, the disclosure of which is incorporated by reference herein. Alternatively, winglets (40) may be configured in accordance with any of the teachings in U.S. Pub. No. 2008/0014090, entitled "Cuffed Fan Blade Modifications," published Jan. 17, 2008, the disclosure of which is incorporated by reference herein. In other versions, winglets (40) are configured in accordance with any of the teachings in U.S. Pub. No. 2008/0213097, entitled "Angled Airfoil Extension for Fan Blade," published Sep. 4, 2008, the disclosure of which is incorporated by reference herein. Still other suitable configurations for winglets (40) will be apparent to those of ordinary skill in the art in view of the teachings herein. Of course, as with other components described herein, winglets (40) may simply be omitted altogether.

Figure 2:
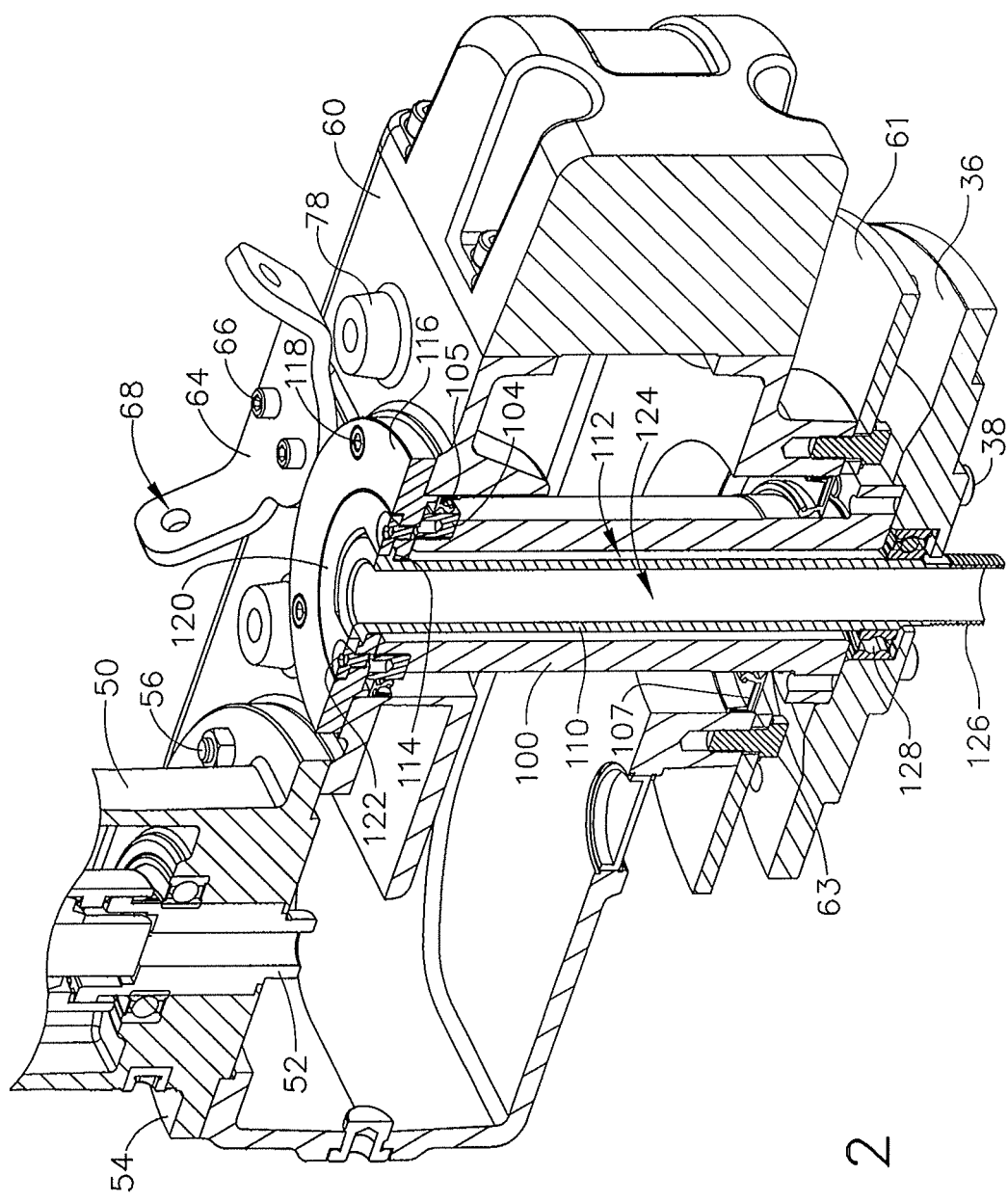
FIG. 2 depicts a partial perspective cross-sectional view of the drive assembly of the fan system of FIG. 1.

Motor (50) of this example has an external stator (not shown) with windings; and a rotor without windings. The rotor is coupled with an output shaft (52), which rotates unitarily with the rotor. Output shaft (52) is in communication with gearbox (60), as shown in FIG. 2, and as will be described in greater detail below. Motor (50) of the present example is configured to provide a maximum output power to gearbox (60) of approximately one to approximately two or approximately three horsepower (all inclusive); and a maximum output speed between approximately 1,750 RPM, inclusive, and approximately 3,500 RPM, inclusive. Alternatively, motor (50) may provide any other desired output power and/or output speed.

As shown in FIG. 2, a flange (54) extends outwardly from the bottom of motor (50), and is used with fasteners (56) to secure motor (50) to gearbox (60). Motor (50) also includes a control interface (58), through which motor (50) receives commands from control box (80), as will be described in greater detail below. Of course, motor (50) may also send data to control box (80) via control interface (58) in some versions, including but not limited to data indicative of motor temperature, speed, etc., though such communications are not necessary in all versions. Communication through control interface (58) may thus be unidirectional or bi-directional. It should be understood that motor (50) may be varied in any number of ways. By way of example only, motor (50) may have an internal stator and an external rotor. Still other ways in which motor (50) may be varied will be apparent to those of ordinary skill in the art in view of the teachings herein.

Gearbox (60) of the present example is a mechanical gearbox, and is configured to transfer rotary motion from output shaft (52) of motor (50) to a hollow output shaft (100) that is secured to hub mounting flange (36) as will be described in greater detail below. In particular, gearbox (60) includes gears (not shown) that are in a parallel arrangement and are configured to provide a gear ratio of approximately 38:1 in the present example. Alternatively, any other suitable ratio may be used. In the present example, output shaft (100) is driven by a gear (not shown) that is coaxial with output shaft (100) and shrink/press fit to output shaft (100). Alternatively, a gear or other component may be keyed to or otherwise engaged with output shaft (100). Referring back to the present example, this gear that is coaxially fitted to output shaft (100) is engaged by another gear (not shown) on a parallel intermediate shaft (not shown), which is itself engaged by yet another gear (not shown) on yet another parallel intermediate shaft (not shown), which is coaxial with motor (50). These gears and shafts are omitted from the present drawings to provide clarity. Suitable structures and configurations for such gears and shafts will be apparent to those of ordinary skill in the art in view of the teachings herein, as will other suitable contents of and arrangements within a gearbox (60) (to the extent that a gearbox (60) is used at all).

Gearbox (60) and motor (50) are also configured to provide an output torque of approximately 2,500 inch-pounds in the present example. Alternatively, gearbox (60) and motor (50) may provide an output torque between approximately 2,500 inch-pounds, inclusive, and approximately 3,300 inch-pounds, inclusive. Alternatively, gearbox (60) and motor (50) may provide an output torque between approximately 2,500 inch-pounds, inclusive, and approximately 3,800 inch-pounds, inclusive. Alternatively, gearbox (60) and motor (50) may provide an output torque between approximately 3,300 inch-pounds, inclusive, and approximately 3,800 inch-pounds, inclusive. Of course, any other suitable output torque may be provided, including but not limited to output torque that is less than approximately 2,500 inch-pounds, inclusive, or greater than approximately 3,800 inch-pounds, inclusive.

In some versions, motor (50) and gearbox (60) are configured such that the maximum rotational speed of fan system (10) is between approximately 125 RPM, inclusive, and approximately 250 RPM, inclusive. For instance, a maximum rotational speed of approximately 180 RPM may be used. In some other versions, a maximum rotational speed may be between approximately 50 RPM, inclusive, and approximately 100 RPM, inclusive. For instance, a maximum rotational speed of approximately 82 RPM may be used. In other versions, a maximum rotational speed may be between approximately 35 RPM, inclusive, and approximately 55 RPM. For instance, a maximum rotational speed of approximately 42 RPM may be used. Of course, any other suitable rotational speed may be used.

Gearbox (60) of the present example is formed of standard class 30 gray iron, though any other suitable material or combinations of materials may be used. Gearbox (60) may have also a variety of alternative components, features, and components, if desired. Furthermore, gearbox (60) may be omitted altogether if desired. By way of example only, output shaft (52) of motor (50) may be coupled directly with hollow output shaft (100) in any suitable fashion.

Figure 6:
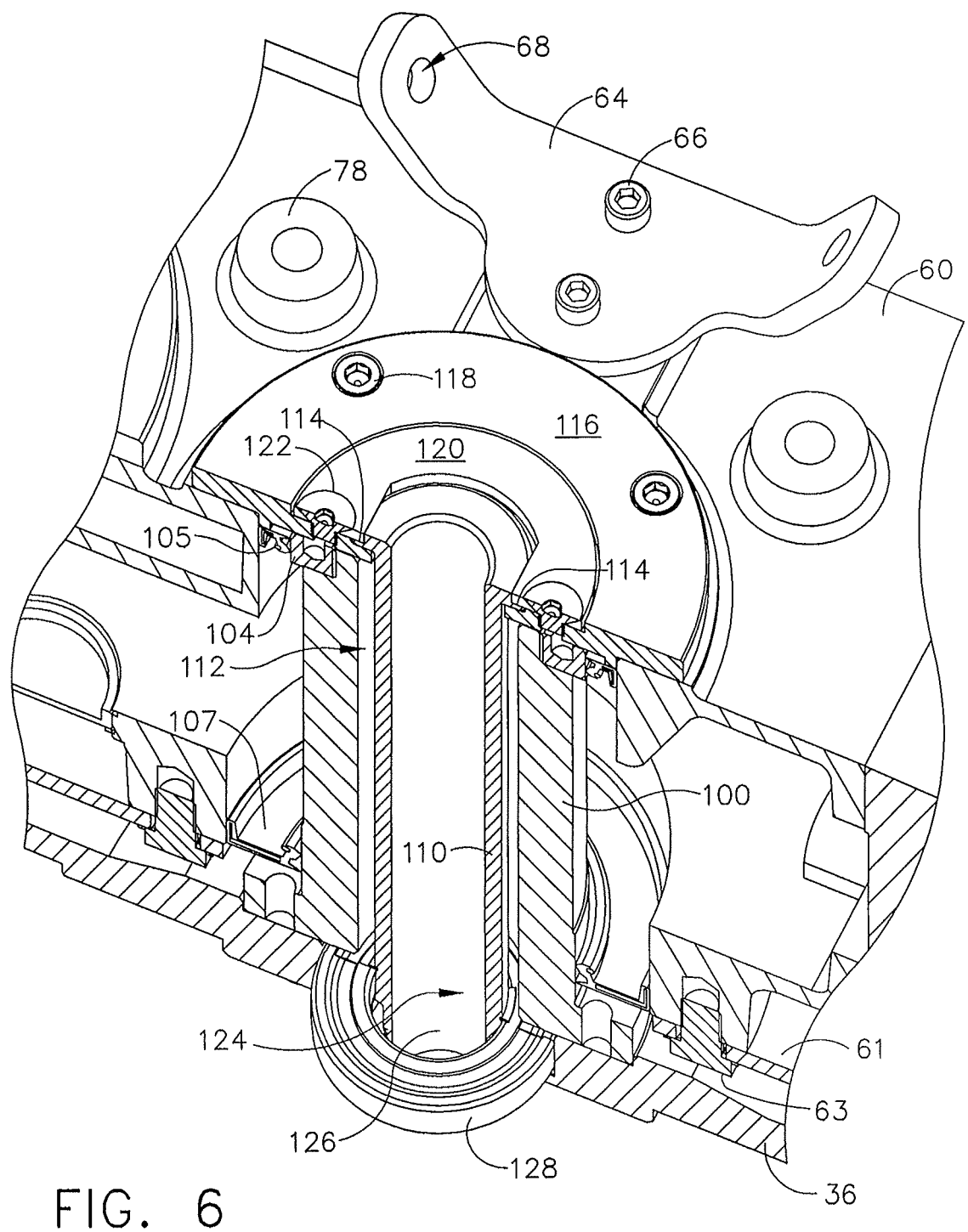
FIG. 6 depicts another partial perspective cross-sectional view of the drive assembly of the fan system of FIG. 1, showing an upper side of the drive assembly.
Figure 7:
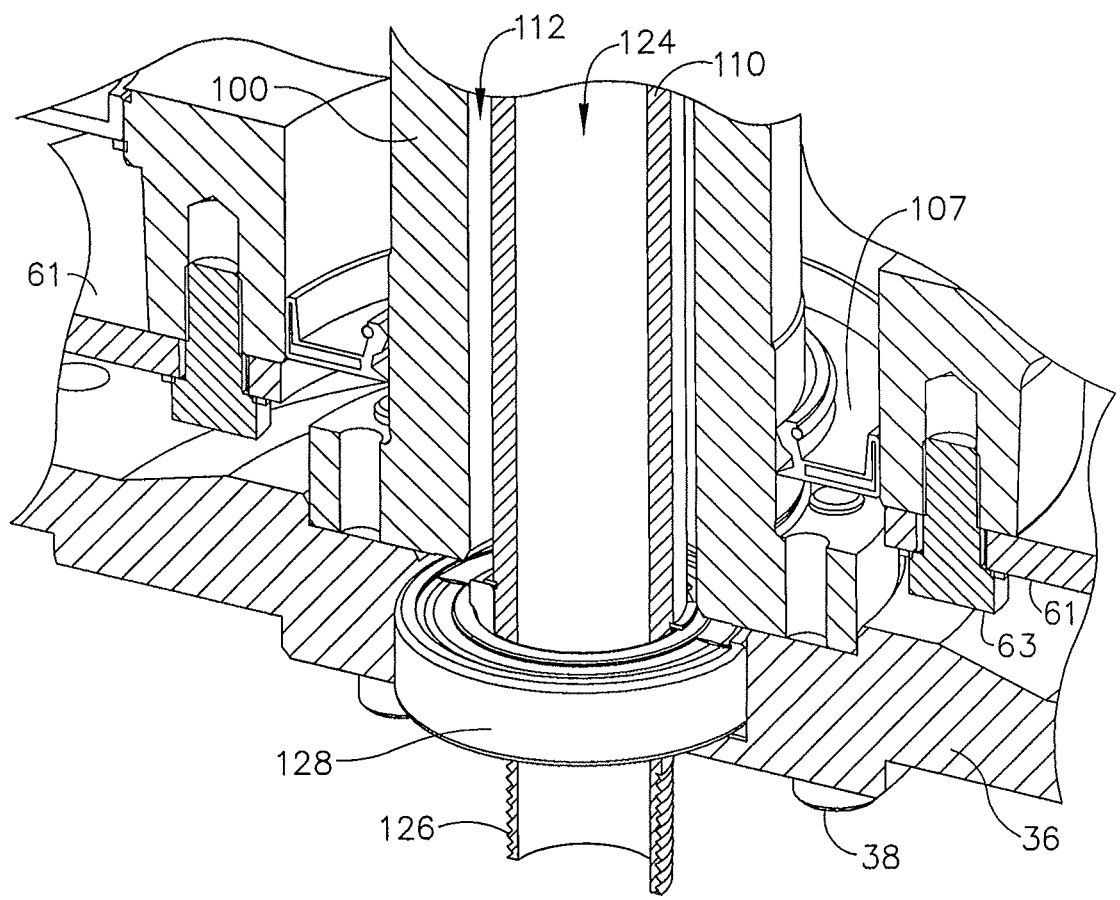
FIG. 7 depicts another partial perspective cross-sectional view of the drive assembly of the fan system of FIG. 1, showing a lower side of the drive assembly.

As shown in FIGS. 1, 2, and 6, a bracket (64) is secured to the top of the housing of gearbox (60) by a pair of fasteners (66) in the present example, though any suitable alternative to fasteners (66) may be used. Bracket (64) defines a pair of openings (66), through which one or more light gauge guy wires (not shown) may be fed. Such guy wires may be secured to a ceiling or other structure. Of course, bracket (64) may be modified or re-located in any suitable fashion, if not omitted altogether. Guy wires are also merely optional.

As shown in FIGS. 1-4 and 6-7, a plate (61) is secured to the bottom of the housing of gearbox (60) in the present example by a plurality of fasteners (63), though any suitable alternative to fasteners (63) may be used. By way of example only, plate (61) may be formed of steel or any other suitable material or combination of materials. As shown in FIG. 1, several brackets (65) extend inwardly from hub (30). Brackets (65) are configured such that they extend over the top of plate (61) without contacting plate (61) during normal operation of fan system (10). Brackets (65) may thus rotate with hub (30) without contacting the top of plate (61), such that the radially inward-most portions of brackets (65) instead essentially "hover" over plate (61). Brackets (65) are further configured such that, in the event that hub (30) decouples from hub mounting flange (36), or in the event that hub mounting flange (36) decouples from output shaft (100), brackets will catch on plate (61) to prevent such components from falling completely free of the upper portions of fan system (10). Plate (61) and brackets (65) may thus provide a safety measure in case of failure of fasteners (63, 38) or other components of fan system (10). As with other components described herein, however, plate (61) and brackets (65) are merely optional, and may have any other suitable components, features, or configurations as desired.

Figure 5:
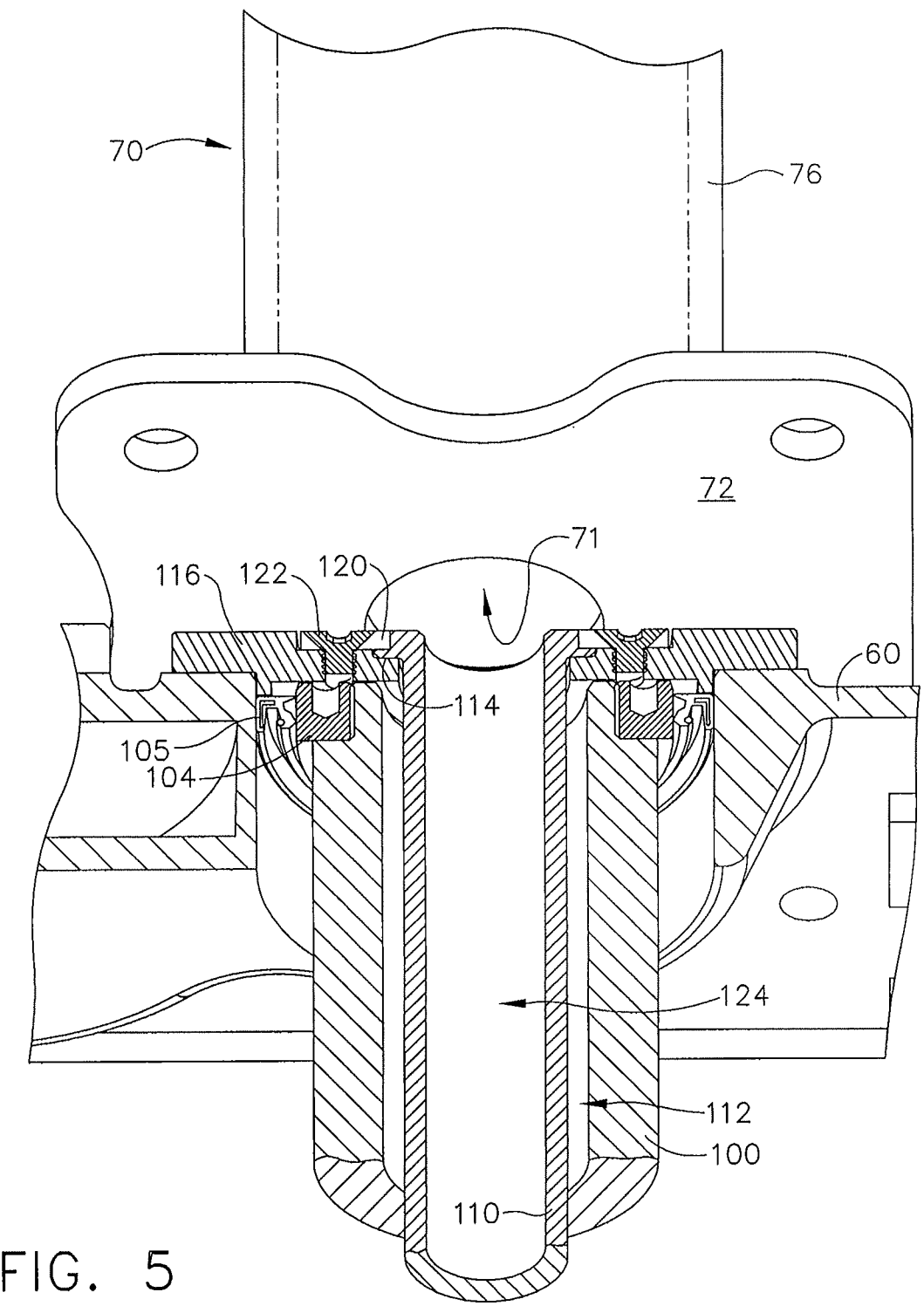
FIG. 5 depicts a partial perspective cross-sectional view of the drive assembly of the fan system of FIG. 1, showing an upper side of the drive assembly.

Mounting member (70) of the present example comprises a lower flange (72), an upper flange (74), and an extension (76) extending between lower flange (72) and upper flange (74). Upper flange (74) is configured to be secured to a ceiling or other structure. As shown in FIGS. 1 and 5, lower flange (72) is secured to gearbox (60) by a plurality of fasteners (not shown). As shown in FIGS. 2 and 6, raised bosses (78) are interposed between lower flange (72) and gearbox (60) in this example. Bosses (78) are formed of iron or cast iron, though any other suitable material or combination of materials may be used. Furthermore, bosses (78) may be omitted if desired and/or supplemented with resilient dampers (e.g., rubber) or other features. In the present example, mounting member (70) is formed of metal, though any other suitable material or combinations may be used. Of course, mounting member (70) may have any other suitable features, components, or configurations. By way of example only, mounting member (70) may be configured in accordance with the teachings of U.S. Non-Provisional patent application Ser. No. 12/203,960, entitled "Ceiling Fan with Angled Mounting," filed Sep. 4, 2008, the disclosure of which is incorporated by reference herein. For instance, the device described in that patent application may be secured to upper flange (74); or directly to gearbox (60) in lieu of having mounting member (70) as shown. Still other suitable structures, devices, and techniques for mounting fan system (10) to a ceiling or other structure will be apparent to those of ordinary skill in the art in view of the teachings herein.

Figure 8:
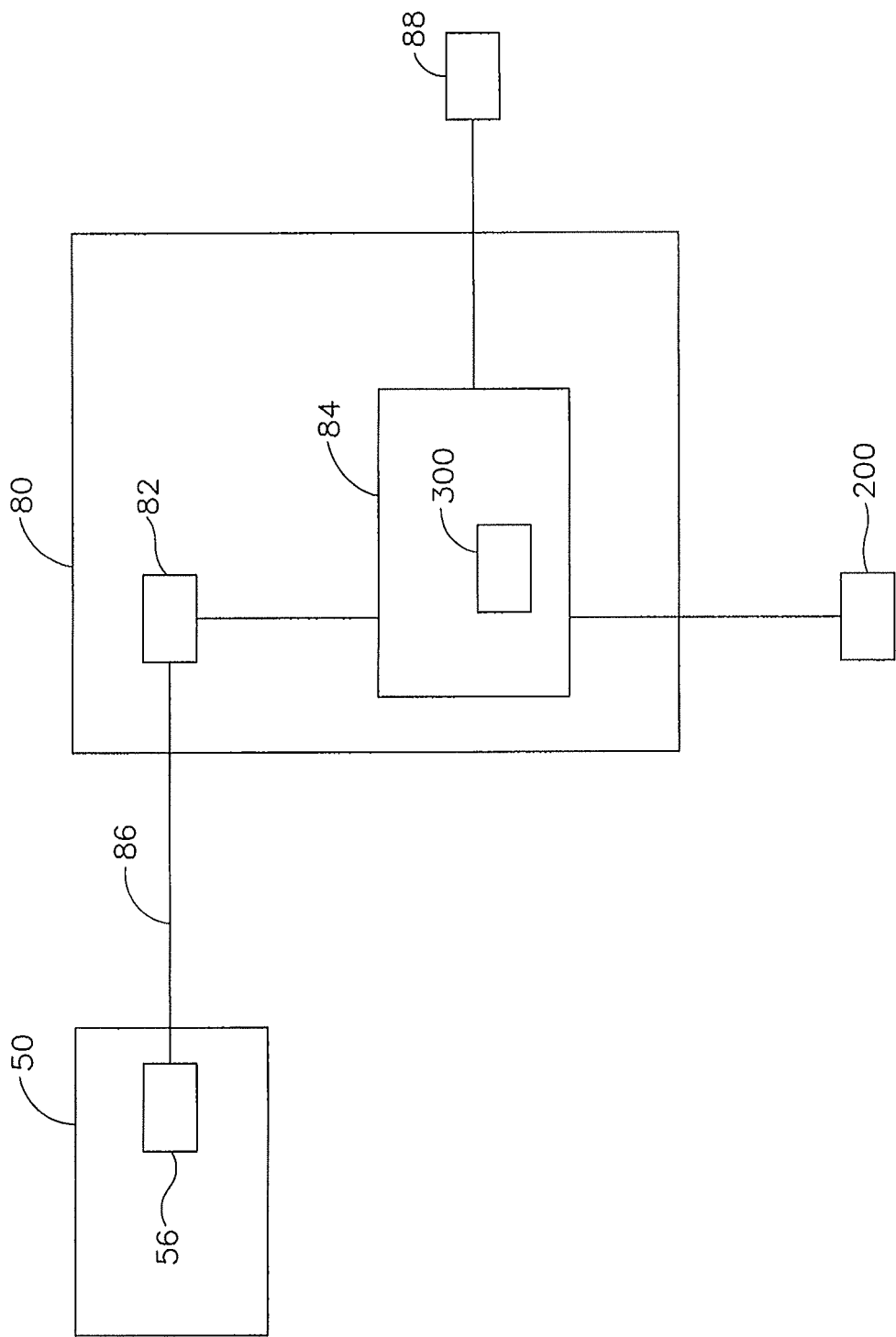
FIG. 8 depicts a schematic view of the control system of the fan system of FIG. 1.

Control box (80) is in communication with motor (50). Control box (80) of the present example is mounted to extension (76) in the present example, though control box (80) may alternatively be mounted in any other suitable location, including but not limited to a ceiling or wall remote from fan system (10). In some other variations, the contents of control box (80) are integrated into motor (50). As shown in FIG. 8, control box (80) of the present example includes a variable frequency drive (82) and a circuit board (84) that has an accelerometer (300). An external power supply (88) is coupled with circuit board (84), providing power for fan system (10). Variable frequency drive (82) is coupled with control interface (58) of motor (50) via an electrical cable (86). Of course, any other suitable devices or techniques may be used to provide communication from variable frequency drive (82) to control interface (58). Furthermore, variable frequency drive (82) may be substituted, supplemented, or omitted as desired. Ways in which accelerometer (300) may be used will be described in greater detail below. However, it should be understood that, as with other components described herein, accelerometer (300) is merely optional.

Concentric Stationary Tube and Hollow Output Shaft

Figure 3:
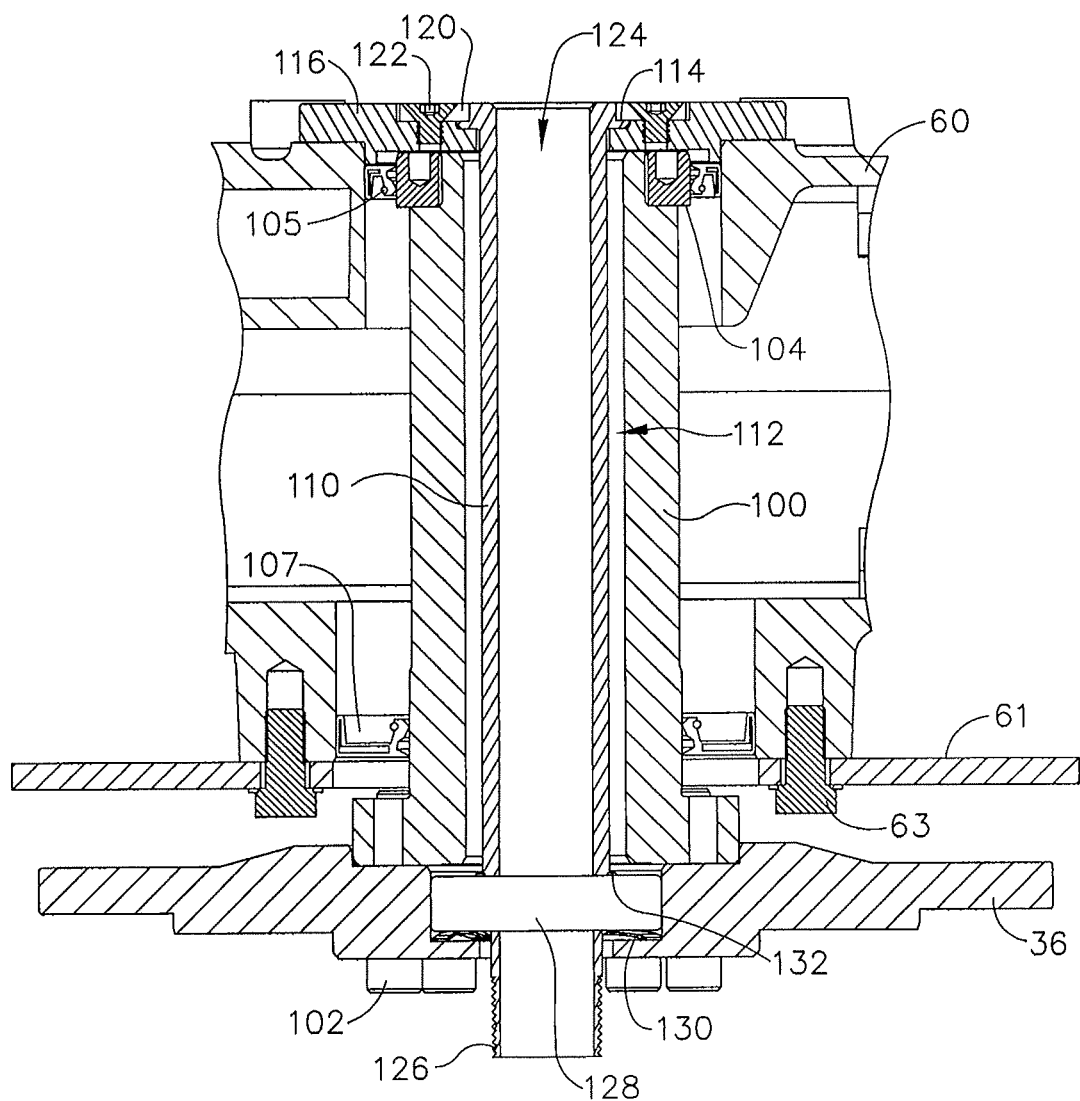
FIG. 3 depicts a partial side cross-sectional view of the drive assembly of the fan system of FIG. 1.
Figure 4:
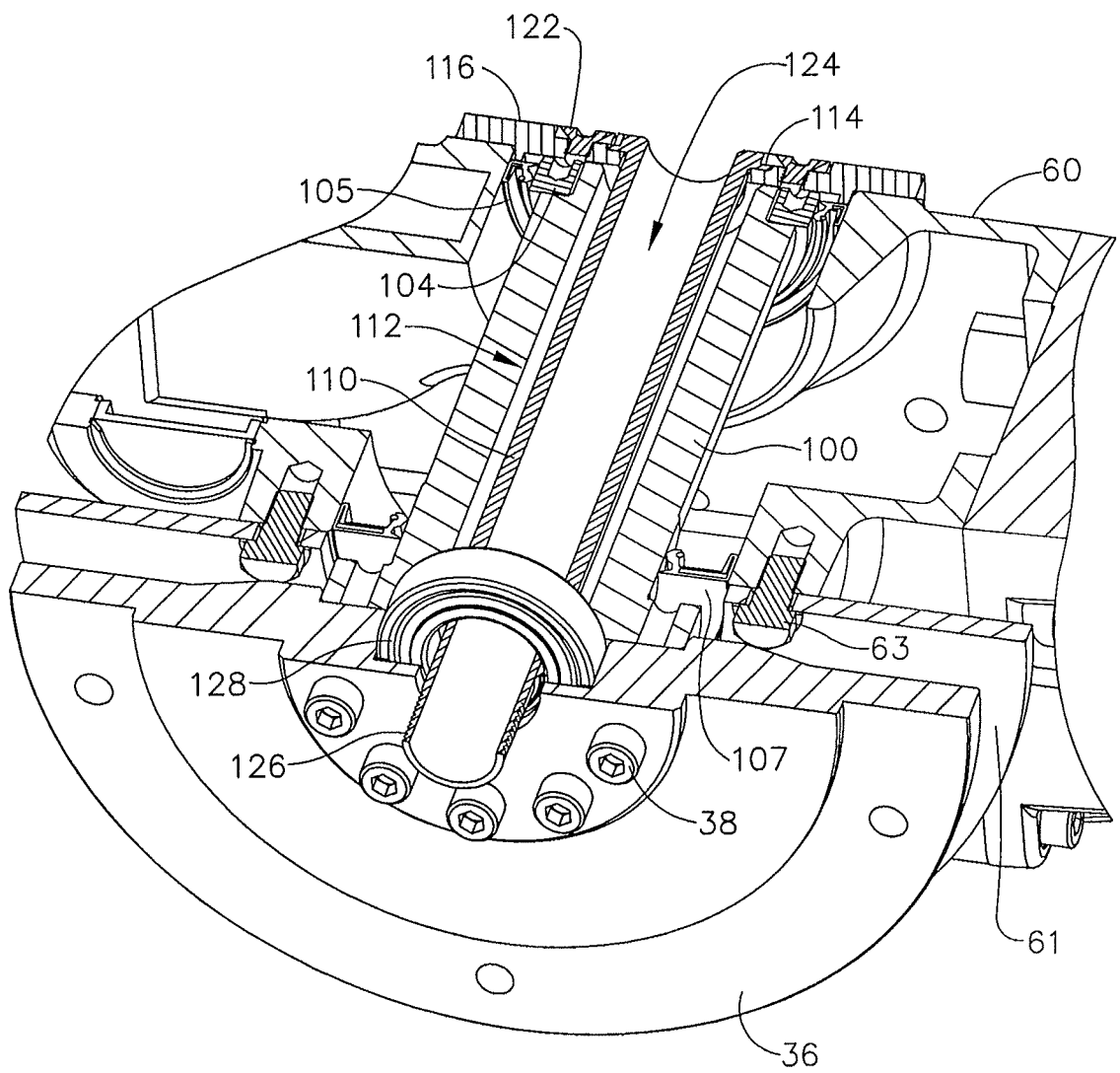
FIG. 4 depicts a partial perspective cross-sectional view of the drive assembly of the fan system of FIG. 1, showing a lower side of the drive assembly.

As noted above, and as shown in FIGS. 2-7, gearbox (60) provides a drive output through hollow output shaft (100). As shown in FIG. 4, hollow output shaft (100) is coupled with hub mounting flange (36) by a plurality of fasteners (38), such that hub mounting flange (36) (and, consequently, hub (30)) rotates unitarily with output shaft (100). Alternatively, any other suitable devices, features, or techniques may be used to secure output shaft (100) to hub mounting flange (36), including but not limited to welding. An upper bearing (104) and an upper seal (105), as well as a lower bearing (not shown) and a lower seal (107), are provided between output shaft (100) and the housing of gearbox (60), such that output shaft (100) may rotate freely relative to the housing of gearbox (60) without any lubricant loss from gearbox (60).

A stationary tube (110) is positioned coaxially within output shaft (100). While stationary tube (110) is shown as having a generally circular cross section, stationary tube (110) may have any other suitable shape. A gap (112) is provided between the outer wall of stationary tube (110) and the inner wall of output shaft (100), such that output shaft (100) may rotate freely about stationary tube (110) without causing rotation of stationary tube (110). By way of example only, output shaft (100) may have an inner diameter of approximately 1.625 inches, while stationary tube (110) may have an outer diameter of approximately 1.575 inches, such that gap (112) provides approximately 0.050 inches of clearance between output shaft (100) and stationary tube (110). Stationary tube (110) may also have an inner diameter of approximately 1.250 inches by way of example only. Of course, output shaft (100) and stationary tube (110) may have any other suitable inner diameter(s) and/or outer diameter(s) as desired, and gap (112) may provide any desired amount of clearance. For example, stationary tube (110) may have an outside diameter of approximately 1.05 inches and an inside diameter of approximately 0.8 inches, or any other suitable dimensions. Furthermore, the inner diameter and/or outer diameter of shaft (100) and/or stationary tube (110) need not be consistent along the length of these components.

Stationary tube (110) has an integral upper flange (114). A first annular plate (116) is secured to the housing of gearbox (60) by a plurality of fasteners (118), though any other suitable devices or techniques may be used to secure first annular plate (116) to the housing of gearbox (60). Stationary tube (110) is inserted through the center of first annular plate (116), such that upper flange (114) engages first annular plate (116) as may be seen in FIGS. 2-6. First annular plate (116) thus restricts vertically downward movement of stationary tube (110). First annular plate (116) may thus distribute the load of stationary tube (110) across a greater surface area of the housing of gearbox (60) than the surface area that would be provided by upper flange (114). In some other versions, however, upper flange (114) has a diameter that is approximately the same as the diameter of first annular plate (116) of the present example, and first annular plate (116) is simply omitted altogether. Alternatively, any other suitable features or configurations may be used. By way of example only, the upper end of stationary tube (110) may be secured directly to lower flange (72) by fasteners, welding, or other means, with loads passing through lower flange (72) and extension (76) to upper flange (74).

In the present example, a second annular plate (120) is positioned over upper flange (114), and is secured to first annular plate (116) by fasteners (122). Again, though, any suitable types of or alternatives to fasteners (122) may be used. It should be understood that second annular plate (120) restricts vertically upward movement of stationary tube (110) in the present example. In other words, first annular plate (116) and second annular plate (120) cooperate with upper flange (114) to prevent or otherwise restrict any vertical movement of stationary tube. Second annular plate (120) also includes flats within its opening, which are configured to complement flats at the top of stationary tube (110). Second annular plate (120) may also thus prevent stationary tube (110) from rotating relative to gearbox (60). Alternatively, any other suitable features, components, devices, or techniques may be used to prevent rotation of stationary tube (110).

In the merely exemplary alternative version referred to above where upper flange (114) has a wider diameter in lieu of using first annular plate (116), second annular plate (120) may be omitted. For instance, in this exemplary alternative, the housing of gearbox (60) may directly restrict downward vertical movement of stationary tube (110) by directly engaging upper flange (114); while fasteners or welding, etc. may restrict upward vertical movement (and prevent rotation) of stationary tube (110) by directly engaging upper flange (114). Similarly, in the merely illustrative alternative version referred to above where the upper end of stationary tube (110) is secured directly to lower flange (72), both first and second annular plates (116, 120) may be omitted, both rotation and vertical movement of stationary tube (110) being prevented by lower flange (72). Still other suitable features, components, devices, and techniques that may be used to secure stationary tube (110) relative to gearbox (60) will be apparent to those of ordinary skill in the art in view of the teachings herein.

Stationary tube (110) defines a central opening (124), through which wires, cables, plumbing, etc. may be passed. Extension (76) of mounting member (70) also defines an opening (71). As shown in FIG. 5, openings (71, 124) are substantially coaxially aligned when mounting member (70) is secured to gearbox (60). Thus, whatever is fed through opening (124) (if anything is fed therethrough at all) may be fed from opening (71). As shown in FIGS. 2-4 and 7, stationary tube (110) is substantially longer than output shaft (100). In particular, a lower end (126) of stationary tube (110) protrudes downwardly past hub mounting flange (36) and the lower plane defined by hub (30). Lower end (126) of stationary tube (110) is threaded in this example, though such threading is not necessary. Exposed lower end (126) may be used to mount a variety of components, including but not limited to a platform (e.g., to which a variety of components may be mounted), a detector (200) as will be described in greater detail below, one or more lights/lamps, a sprinkler head, etc. Furthermore, it should be understood that since stationary tube (110) does not rotate, and is instead rotationally fixed relative to rotating components of fan system (10), anything mounted to lower end (126) will also not rotate in this example.

In some versions, a gap is provided between the outer perimeter of stationary tube (110) and the central opening of hub mounting flange (36). In the present example, however, a bearing (128) is provided between stationary tube (110) and hub mounting flange (36). It should be understood that bearing (128) of this example restricts transverse movement of lower end (126) while also permitting hub mounting flange (36) and hub (30) to freely rotate about stationary tube (110). As shown in FIG. 3, a wave washer (130) and a retainer ring (132) restrict vertical movement of bearing (128). Of course, a polymer bushing or a variety of other alternative components may be provided between stationary tube (110) and hub mounting flange (36), and there may be a variety of other relationships between stationary tube (110) and hub mounting flange (36).

It should be understood from the foregoing that stationary tube (110) may provide both a non-rotating feature (e.g., lower end (126), etc.) for attaching a variety of accessories to a fan system (10) and a passage (e.g., opening (124), etc.) through which electricity, further structural support, fluids, etc. may be provided to such accessories. Furthermore, output shaft (100), gearbox (60), hub (30), and associated components may provide rotation to drive fan blades (20) without substantially interfering with the above-noted aspects of stationary tube (110).

Fire/Smoke Detection and Automatic Shut-Down Device

Some versions of fan system (10) include a detector (200). Detector (200) may be mounted to lower end (126) of stationary tube (110), directly or indirectly (e.g., to a platform that is mounted to lower end (126), etc.). Detector (200) may thus be mounted below a lower plane defined by hub (30). Alternatively, detector (200) may be mounted on or near the top of hub (30), on or near upper flange (74), or at any other suitable location.

Detector (200) may be communicatively coupled with control box (80) in a variety of ways. For instance, one or more wires (e.g., for providing power to detector (200) and/or communicating an alarm signal from detector (200), etc.) or other means of communication may be fed from detector (200), through opening (124) of stationary tube (110), and to circuit board (84) or some other component of control box (80), or to a separate device in communication with control box (80). Alternatively, detector (200) may communicate to control box (80) wirelessly, using any suitable devices or techniques. Furthermore, it should be understood from the teachings herein that detector (200) may be used on virtually any fan system, and need not necessarily be used with a fan system (10) that has a stationary tube (110). For instance, in the case of a fan motor having a rotating outer shell and a non-rotating central core, wiring to/from detector (200) may be passed through an opening in the non-rotating central core of the motor. Exemplary ways in which detector (200) may be used, including but not limited to influencing control of fan system (10), will be described in greater detail below, while other ways will be apparent to those of ordinary skill in the art in view of the teachings herein.

It will also be appreciated that detector (200) may be powered by a self-contained battery. Such self-contained battery may be provided with a "low-battery" warning device (e.g., visible light and/or siren, etc.). Still other ways in which a detector (200) or similar device may be powered and/or communicated with (e.g., alternative structures, arrangements, configurations, etc.) will be apparent to those of ordinary skill in the art in view of the teachings herein.

In some versions, detector (200) comprises a mechanical heat detector device. Detector (200) and control box (80) may be configured such that fan system (10) will automatically stop operating when a fire is detected. While the present example discusses a mechanical heat sensor device, it will be appreciated that any other type of heat sensor device (e.g., a merely electrical heat sensor device, etc.), or any other type of device that is operable to sense one or more conditions associated with a fire (e.g., smoke, etc.), may be used in addition to or in lieu of a mechanical heat detector device. By way of example only, a suitable heat detector device may comprise a BK-5601P heat detector device from System Sensor of St. Charles, Illinois. Alternatively, any other type of heat detector or sensor may be used for detector (200).

In one merely illustrative example, detector (200) is activated by a rapid increase in temperature. By way of example only, the rate of increase sufficient to trigger a response by detector (200) may be approximately 14° F. per minute, approximately 15° F. per minute, or such other value as is deemed suitable for the purpose. In addition to or in lieu of being activated by temperature increasing at a rate that exceeds a threshold rate, detector (200) may be activated by the temperature itself exceeding a certain threshold (e.g., approximately 135° F.).

In other versions, detector (200) comprises a smoke detector. By way of example only, detector (200) may comprise a VESDA® aspirating smoke detector with a laser detection chamber, by Xtralis Inc. of Norwell, Massachusetts. Alternatively, any other suitable smoke detector may be used. Furthermore, as noted above, a smoke detector version of detector (200) may be mounted on or near lower end (126) of stationary tube (110) or elsewhere. For instance, in a merely exemplary implementation of a VESDA® aspirating smoke detector, an aspiration pipe (not shown) is fed through opening (71) of mounting member (70) and through opening (124) of stationary tube (110). A free end of the aspiration pipe is thus positioned within stationary tube (110) or protrudes below lower end (126) of stationary tube (126). Detector (200) may then be located remote from fan system (10), within control box (80), or elsewhere, with the same aspiration pipe being fed in any suitable fashion to detector (200). As noted above, a remote detector (200) may be in communication with control box (80) via one or more wires and/or wirelessly. A fan, pump, or other device may be used to draw air through the aspiration pipe, to assist in air reaching detector (200). Of course, there are a variety of alternative ways in which a detector (200), either a VESDA® aspirating smoke detector or other type of detector, may be incorporated into fan system (10).

While the foregoing examples of a detector (200) provide detection of conditions consistent with a fire (such as the temperature rising at a rate that exceeds a threshold, the temperature itself exceeding a threshold, or the presence of smoke), detector (200) may alternatively be configured to detect other conditions that are consistent with a fire. Detector (200) may also be able to detect all of the above types of conditions, and need not necessarily be limited to detecting just one of the above types of conditions. Furthermore, while the examples described herein relate to detector (200) detecting conditions that are consistent with a fire, detector (200) may alternatively be configured to detect a variety of other types of conditions, in addition to or in lieu of detecting conditions that are consistent with a fire. Such alternative conditions will be apparent to those of ordinary skill in the art in view of the teachings herein.

In the present example, a signal from detector (200) is used to trigger a shut-down sequence that brings fan system (10) to a stop upon detection of conditions that are consistent with a fire. Alternatively, a signal from detector (200) may merely cause the rotation of fan system (10) to slow down without necessarily stopping. It will also be appreciated that a signal from detector (200) may be used to trigger a general fire alarm (e.g., trigger a localized fire alarm and/or communicate the presence of a fire to a local fire department, etc.), in addition to or in lieu of affecting operation of fan system (10). Still other ways in which a signal from a detector (200) may be used will be apparent to those of ordinary skill in the art in view of the teachings herein.

A fan system (10) with detector (200) as described herein may be configured to permit normal operation of "early suppression fast response" (ESFR) (or other types of) fire suppression system sprinklers. For instance, in some versions, detector (200) may detect a relatively rapid rise in heat and/or the presence of smoke, etc., and stop or slow fan system (10) accordingly, before a sprinkler system detects a rapid rise in heat and/or the presence of smoke. Detector (200) may even be placed in communication with an ESFR system, and may trigger such a system in addition to or in lieu of affecting operation of fan system (10) and/or triggering one or more types of alarms. Of course, detector (200) may be limited to just affecting operation of fan system (10) in some versions, without communicating with any other devices or systems, or may be in communication with devices or systems that are not explicitly mentioned herein.

Impact/Imbalance Detection and Automatic Shut-Down Device

As noted above, fan system (10) of the present example comprises an accelerometer (300). In the event of either an impact or a significant imbalance condition, accelerometer (300) may detect a lateral acceleration resulting from the impact or imbalance, and may send a corresponding signal to circuit board (84). While accelerometer (300) is integrated into control box (80) in the present example, it should be understood that accelerometer (300) may alternatively be provided in a separate module attached to fan system (10), and control box (80) may be a separate module either attached to fan system (10) or located remotely. Other suitable locations for accelerometer (300) or ways of incorporating an accelerometer (300) into fan system (10) will be apparent to those of ordinary skill in the art in view of the teachings herein.

It will be appreciated that there are a variety of ways in which a signal from accelerometer (300) may be used influence the operation of fan system (10). For instance, the signal from accelerometer (300) may initiate a controlled deceleration sequence to bring fan system (300) to a gradual and controlled stop. Alternatively, the signal from accelerometer (300) may simply cause power supply (88) to be disconnected from motor (50) (e.g., by opening a switch on circuit board (84) or elsewhere within control box (80), etc.). Alternatively, the signal from accelerometer (300) may initiate a panic stop sequence in which power is used to force fan system (10) to stop immediately. Other ways in which a signal from accelerometer (300) may be used influence the operation of fan system (10) will be apparent to those of ordinary skill in the art in view of the teachings herein. It will also be appreciated that the sensitivity of accelerometer (200) may be adjustable to permit an acceptable level of imbalance, movement, or minor contact without falsely triggering an emergency stop sequence.

Furthermore, to the extent that the sensitivity of accelerometer (200) is adjustable, fan system (10) may be configured whereby different conditions sensed by accelerometer (200) may produce different results. For instance, if accelerometer (200) detects a significant deceleration in fan system (10) (e.g., caused by a rigid obstruction moving into and staying within the path of fan blades (20), etc.), the control box (80) may force fan system (10) to stop immediately; whereas if accelerometer (200) detects a slight deceleration in fan system (10) (e.g., caused by flying debris bouncing off of a fan blade (20)), control box (80) may simply slow fan system (10) down, to a gradual halt or merely temporarily, etc. Of course, any other suitable control response or control responses may be used in response to a variety of conditions. Furthermore, any suitable alternative to accelerometer (200) may be used, to detect any of the above noted conditions or to detect other conditions.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:
1. A fan system, the fan system comprising:
(a) a hub, wherein the hub is configured to rotate;
(b) a plurality of fan blades mounted to the hub;
(c) a drive system comprising:
i. a rotatable hollow output shaft extending through a housing, wherein the rotatable hollow output shaft is in communication with the hub,
ii. a motor, wherein the motor is operable to rotate the hub via the rotatable hollow output shaft, and

(d) a stationary tube inserted through the rotatable hollow output shaft, wherein the stationary tube is configured to remain stationary as the rotatable hollow output shaft rotates;
(e) at least one mount for mounting to an upper portion of the stationary tube;
(f) a hub mounting flange secured to the rotatable hollow output shaft by a plurality of fasteners.

2. The fan system of claim 1, wherein the at least one mount comprises a plate.

3. The fan system of claim 2, wherein the plate is generally annular, with a central opening for receiving the upper portion of the stationary tube.

4. The fan system of claim 1, wherein the at least one mount is external to the housing.

5. The fan system of claim 1, further including an accessory adjacent a lower end of the stationary tube.

6. The fan system of claim 1, further including a controller in communication with the drive system, and an accessory in communication with the controller, wherein the accessory is coupled to a bottom end of the stationary tube.

7. The fan system of claim 1, wherein a lower portion of the stationary tube is threaded.

8. A fan system, the fan system comprising:
(a) a hub, wherein the hub is configured to rotate;
(b) a plurality of fan blades mounted to the hub;
(c) a drive system comprising:
i. a rotatable hollow output shaft extending through a housing, wherein the rotatable hollow output shaft is in communication with the hub,
ii. a motor, wherein the motor is operable to rotate the hub via the rotatable hollow output shaft;
(d) a stationary tube inserted through the rotatable hollow output shaft, wherein the stationary tube is configured to remain stationary as the rotatable hollow output shaft rotates; and
(e) a retainer for connecting the stationary tube to the housing;
wherein an outer diameter of a top end of the stationary tube is greater than an inner diameter of the rotatable hollow output shaft.

9. The fan system of claim 8, wherein the stationary tube has a bottom end, wherein the top end of the stationary tube does not project above the retainer.

10. The fan system of claim 8, wherein the top end of the stationary tube is above a top end of the rotatable hollow output shaft.

11. The fan system of claim 8, wherein a bottom end of the stationary tube terminates below a bottom end of the rotatable hollow output shaft.

12. The fan system of claim 8, further including a fastener for fastening the stationary tube to the housing.

13. A fan system, the fan system comprising:
(a) a hub, wherein the hub is configured to rotate;
(b) a plurality of fan blades mounted to the hub;
(c) a drive system comprising:
i. a rotatable hollow output shaft extending through a housing, wherein the rotatable hollow output shaft is in communication with the hub,
ii. a motor, wherein the motor is operable to rotate the hub via the rotatable hollow output shaft,
(d) a stationary tube inserted through the rotatable hollow output shaft, wherein the stationary tube is configured to remain stationary as the rotatable hollow output shaft rotates; and
(e) a plate having an opening greater in diameter than the stationary tube, wherein the plate is not attached to the stationary tube.

* * * * *